G. SYKES.
PACKING DEVICE.
APPLICATION FILED OCT. 8, 1917.
1,327,888.
Patented Jan. 13, 1920.
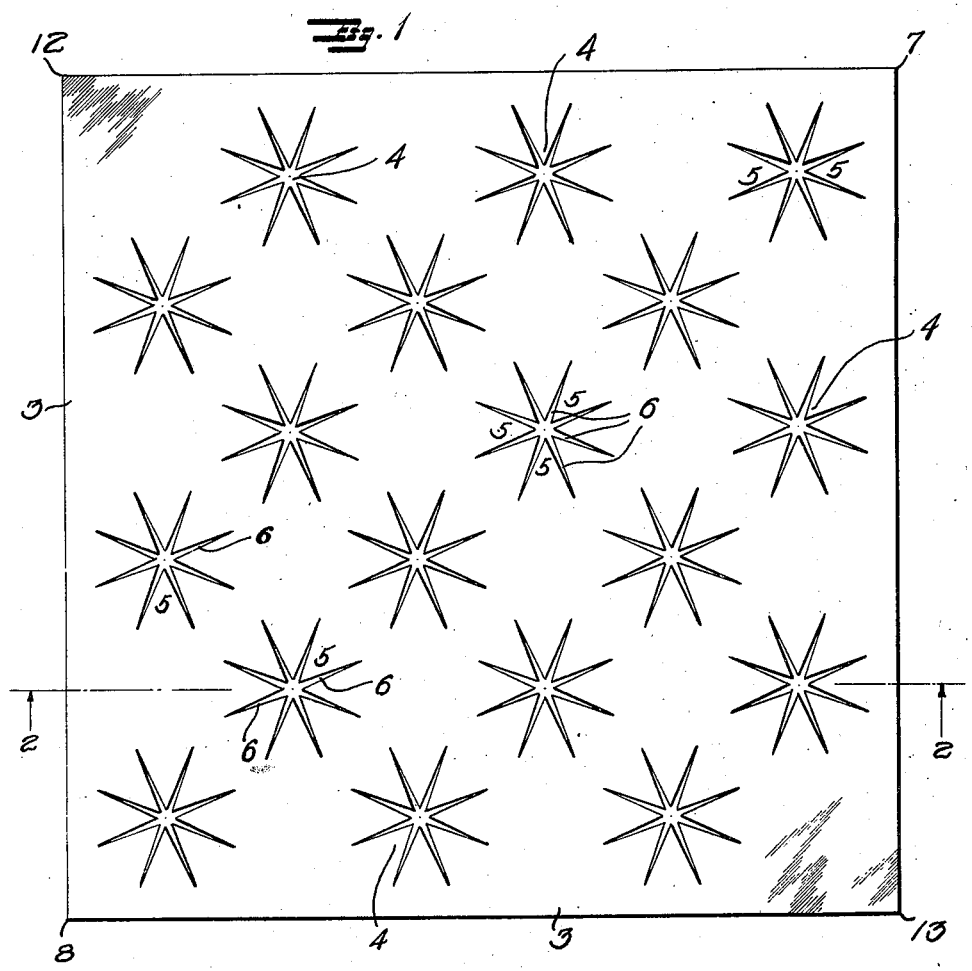
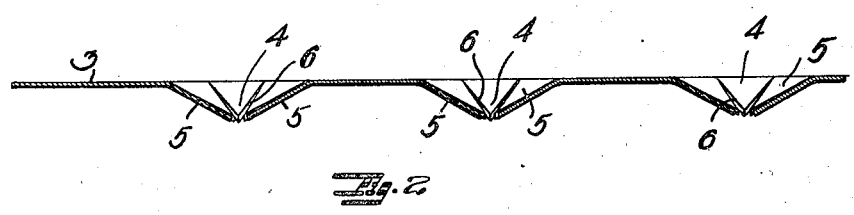
WITNESS
J. B. Gardner
INVENTOR
GEORGE SYKES
By White & Prest
ATTORNEYS

UNITED STATES PATENT OFFICE.

GEORGE SYKES, OF PENRYN, CALIFORNIA, ASSIGNOR TO SYKES STANDARD FRUIT WRAP COMPANY, OF PENRYN, CALIFORNIA, A CORPORATION OF CALIFORNIA.

PACKING DEVICE.

1,327,888.     Specification of Letters Patent.     Patented Jan. 13, 1920.

Application filed October 8, 1917. Serial No. 195,388.

*To all whom it may concern:*

Be it known that I, GEORGE SYKES, a citizen of the United States, and a resident of Penryn, Placer county, State of California, have invented a certain new and useful Packing Device, of which the following is a specification.

The invention relates to a device for use in packing fruit in a box.

An object of the invention is to provide means for determining the arrangement of articles in a package in accordance with a predetermined scheme of arrangement, whereby the largest possible number of such objects may be packed in a given space; whereby the process of packing is expedited and made cheaper and uniform; whereby each article will have a large number of points of support in the pack and internal structural stability produced; whereby the pack may be thoroughly ventilated and whereby the objects are held from contact and partially wrapped.

The invention is particularly useful in packing fruit, such as apples and oranges. In the packing of fruit it is desirable that the pack shall be and remain tight and at the same time contain sufficient voids to allow for proper ventilation. In the fruit packing systems now in general use the fruit is arranged in layers, with the pieces in one layer superposed on the pieces in the lower layer, so that each piece of fruit is supported at not more than six points. Such packs, considered as a unit, have no internal structural stability, so that if one piece of fruit decays or shrinks, the adjacent pieces become loose and this looseness may extend to the entire pack.

In accordance with my invention, each piece of fruit in the pack is supported at least at six points and many are supported at eight points, producing inherent stability which is not destroyed by the shrinkage or decay of a piece of fruit.

The invention possesses other advantageous features, some of which, with the foregoing, will be set forth at length in the following description, where I shall outline in full that form of the invention which I have selected for illustration in the drawings accompanying and forming part of the present specification.

Referring to said drawings:

Figure 1 is a plan view of the packing device of my invention.

Fig. 2 is a cross section taken on the line 2—2, Fig. 1.

I have found that by arranging the articles in layers in the box or package, with the articles in one layer arranged in parallel rows disposed diagonally of the box and the corresponding articles in the parallel rows transversely alined, and with the articles in the superposed layer arranged in diagonal rows which cross the lower rows so that the individual pieces of fruit in the upper layer are disposed over the voids between the pieces of fruit in the under layer, that a very uniform and inherently stable pack is produced and that by this method the largest number of articles may be packed in a given space. In order that the pieces of fruit in one layer may not contact with the pieces of fruit in another layer and produce the deleterious effects of such contact, I have provided a separator sheet or card 3 which is disposed between the successive layers. The sheet 3, which is preferably made of paper or cardboard, is of such flexibility as to be capable of being bent throughout its entire area, by the fruit, to assume a sinuous form at its edges, and is provided with a plurality of indentations 4, which act not only to receive the fruit, but to indicate the proper placing of the fruit. The paper sheet lying between two layers of fruit is deformed or bent by the pieces of fruit, so that it not only separates the pieces of fruit, but partially wraps the fruit, as shown in applicant's co-pending application Serial No. 149,486, filed February 19, 1917. The paper sheet is of sufficient flexibility to permit it to conform to the pieces of fruit thereby providing a close tight pack in which the pieces of fruit in one layer are separated from the pieces in the other layer and in which each piece of fruit is partially wrapped. The indentations may be of any desired form, those in the separator sheet shown comprising a plurality of tongues 5, formed by a plurality of radial cuts 6, and attached to the body of the sheet at their bases, so that when the cut portion is pushed down, the tongues bend downwardly to form the fruit holding depression. The tongues in each depression are so arranged that the points of nearest approach of two adjacent depressions is disposed at the base of a tongue in each depression. The depressions or cut portions are arranged in parallel rows diagonally of the sheet, the center row being arranged diagonally in a line extending from corner 7 to corner 8 of the sheet. The parallel rows are arranged on both sides of the center row and the depressions in the parallel rows are transversely alined with the depressions in the central row. In the separator shown, there are six depressions in the central row, four in each of the adjacent rows and two in each outer row. Since the depressions in the successive rows are transversely alined, six transverse rows of depressions are formed, which for convenience will be termed the parallel transverse rows, which are at right angles to the diagonal rows. The two central transverse rows are placed on opposite sides of the diagonal line connecting the corners 12—13. The tongues 5 are so arranged that a diagonal line drawn through the centers of the depressions in either direction, will bisect two diametrically disposed tongues in each depression. These diametrically disposed tongues are bent down and lie between and separate the pieces of fruit at their points of contact or support. When two separator sheets are superposed with the depressions in register and the upper sheet is turned 90° in its plane with respect to the lower sheet, the depressions in the upper sheet will be staggered with relation to the depressions in the lower sheet and will lie above the flat surfaces occurring between the depressions in the lower sheet.

In packing fruit, a separator sheet having the proper number and spacing of depressions in accordance with the size of the fruit, is laid in the bottom of the box and the first layer of fruit laid on the depressions. A second separator sheet is then laid over the bottom layer with the corner 12 of the second sheet over the corner 7 of the lower sheet and the second layer of fruit placed in the depressions of the second separator and so on, until the box is filled. This causes the pieces of fruit in each layer to lie over the voids in the layer below, producing a very solid and structurally stable pack.

Instead of using only one separator between each two layers, two separators may be used, the lower separator being turned over so that the depressions extend upwardly in registry with the fruit, and the second separator being placed as the second separator in the above-mentioned mode of packing.

I claim.

1. A separator for use in packing fruit, comprising a sheet of conformable material having a plurality of slitted depressions therein adapted to be placed between two layers of fruit to separate and partially wrap the pieces of fruit.

2. A separator for use in packing fruit, comprising a sheet of conformable material adapted to be placed between two superposed layers of fruit, in which layers the pieces of fruit in one layer are staggered with relation to the pieces of fruit in the other layer, the sheet being of such flexibility as to be capable of being bent throughout its entire area to assume a sinuous form at its edges by the pieces of fruit to conform to the adjacent surfaces of the pieces of fruit in the two layers, said sheet being provided with a plurality of spaced depressions to indicate the positioning of the fruit in the upper layer.

3. A separator for use in packing fruit, comprising a sheet of paper of such flexibility that it will conform to the fruit throughout its area, having a plurality of groups of radial cuts therein, each group radiating from a common center, the centers being arranged in rows diagonally of the sheet.

In testimony whereof, I have hereunto set my hand at San Francisco, California, this 26th day of September, 1917.

GEORGE SYKES.

In presence of
H. G. PROST.